United States Patent [19]

Sherer

[11] Patent Number: 4,586,797
[45] Date of Patent: May 6, 1986

[54] SLIDE PROJECTOR SYSTEM

[76] Inventor: Stephen M. Sherer, 71-519 Biskra Rd., Rancho Mirage, Calif. 92270

[21] Appl. No.: 542,049

[22] Filed: Oct. 14, 1983

[51] Int. Cl.⁴ ............................................. G03B 23/08
[52] U.S. Cl. .................................................. 353/109
[58] Field of Search .................. 353/108, 109, 120; 40/366, 367, 364, 511, 512, 526

[56] References Cited

U.S. PATENT DOCUMENTS

| | | |
|---|---|---|
| 1,028,692 | 6/1912 | Dusseris et al. |
| 1,409,186 | 3/1922 | Kothiringer |
| 2,194,240 | 3/1940 | Worth |
| 2,521,348 | 9/1950 | Davis |
| 2,563,893 | 8/1951 | Waller et al. |
| 2,740,326 | 4/1956 | Reinebach |
| 3,170,369 | 2/1965 | Frey et al. |
| 3,503,496 | 3/1970 | Kovarik et al. |
| 3,626,617 | 12/1971 | Frey |
| 3,632,200 | 1/1972 | Frey |
| 3,729,254 | 4/1973 | Frey |
| 3,771,865 | 11/1973 | Frey |
| 3,799,665 | 3/1974 | Frey |
| 3,820,886 | 6/1974 | Frey |
| 3,860,326 | 1/1975 | Frey |
| 3,905,694 | 9/1975 | Miragliotta |
| 3,990,790 | 11/1976 | Styles et al. |
| 4,094,599 | 6/1978 | Frey |
| 4,165,162 | 8/1979 | Frey |

FOREIGN PATENT DOCUMENTS 32749 10/1970 Japan .................................. 353/109

OTHER PUBLICATIONS

Industry Brochure—Illustrations A–F Article by Bruce North entitled "Five-In-One Projector Designed to Simplify Slide Presentations".

*Primary Examiner*—Harry N. Haroian
*Attorney, Agent, or Firm*—Pastoriza, Kelly & Lowry

[57] ABSTRACT

A slide projector system includes a projector and a removable slide cartridge which encloses an endless belt for transporting slides along a generally horizontal pathway. The removable cartridge, when loaded into the projector, advances slides to a viewing gate for projection onto a screen or the like, wherein the viewing gate is associated with an access port in the cartridge to permit direct loading and removal of the slides thereby facilitating the instantaneous projection and viewing of the slides as they are loaded. In one preferred form, the slides are carried along an oblong pathway for presentation at a single viewing gate whereat a drive spindle and a slide catcher wheel cooperate to individually hold the slides. In another preferred form, an expandable endless belt carries the slides along a generally Y-shaped pathway for presentation at either of two separate viewing gates. This expandable belt comprises alternating connected links of slide holders and track-guided expandable webs which are driven through the cartridge by two independently actuated drive spindles.

43 Claims, 17 Drawing Figures

SLIDE PROJECTOR SYSTEM

BACKGROUND OF THE INVENTION

This invention relates generally to the projection of film transparencies or slides, and more specifically, to automatic slide projectors having a magazine or cartridge which holds a group of slides adapted to be fed or indexed successively into a projection position.

It is widely recognized that the 35 mm slide medium has been a workhorse of the communications industry for more than forty years. This medium yields a projected screen image that is brighter, sharper, and provides greater color fidelity than any comparable medium. Moreover, slide shows are typically easier and faster to produce than motion film or video tape. An additional feature of the 35 mm slide medium is that its cost is relatively nominal when compared to the cost of video or motion picture film.

Over the last few decades, the primary instrument used to deliver the 35 mm slide image to the screen has been a carousel-type projector having a plurality of slides supported in a generally ring-shaped slide tray. Notwithstanding the wide acceptance and utilization of carousel-type projectors, there are several limitations and severe drawbacks to the use of such projectors. Indeed, the limits of the 35 mm slide medium have previously been the limits of the carousel-type projector.

More particularly, carousel-type projectors are generally very noisy due to the cumulative effect of loose slides rattling in the tray, the sounds of their electric drive motors and cooling fans, and the distinctive clatter resulting from the several mechanical arms and levers of a slide transport mechanism which inserts and retracts slides from the ring-shaped tray with respect to an underlying viewing port or gate. Bent slides generally cannot be handled by this slide transport mechanism resulting in an irritating and all-too-frequent jamming of the projector. Additionally, and possibly most importantly, the slide transport mechanism of carousel-type projectors is cumbersome and slow with a typical maximum viewing rate of about one slide per second being far too slow for the creation of highly desirable animation and/or dissolving effects. Moreover, the requirement that the slides be removed from the tray for viewing and then reinserted into the tray results in an approximately one-half second screen blackout between successive slides which is disruptive and distracting to a viewer.

In an effort to overcome some of the abovementioned problems and disadvantages of carousel-type slide projectors, many different items of auxiliary projector equipment have been developed for use with carousel-type projectors. For example there are a large number of programmers, coders, decoders, tone generators and special audio playback devices available on the market to provide synchronization of pictures and sound. Additionally, carousel-type projectors have been incorporated into multiple projection devices designed to reduce screen blackout time and to increase the maximum slide viewing rate. However, disadvantages associated with such accessories primarily include the necessity of additional capital outlays to build an acceptable system and the loss of system portability and operational simplicity following the addition of the extra equipment. Moreover, in available multiple projection devices, the images have been projected through different lenses onto a screen from different angular positions which can result in distracting visual effects and which further complicates image focusing and sizing expecially when zoom lenses are used.

Several alternative projectors have been devised which attempt to overcome the many drawbacks of the carousel-type projector. One such alternative projector is disclosed in U.S. Pat. No. 3,170,369, entitled "SLIDE PROJECTOR," issued Feb. 23, 1965. This projector utilizes a slide holder comprising a boxlike magazine having two parallel shafts therein supporting an endless flexible belt with a series of outer spring clips to receive and grip the edges of the slides to be projected. The magazine is designed to be fitted into a recess in the top of the projector so that the slides move through a substantially vertical pathway. The slide carrying magazine is also positioned relative to the optical system of the projector and coupled to its drive mechanism as an incident to insertion. To change from one group of slides to another, one magazine is removed and another is fitted into the projector in its place.

In another, more recently developed alternative projector design, the two shafts are permanently mounted in a projector in upright parallel relation to receive an unsupported floppy flexible endless belt which carries slide holding spring clips and is installed by reception through an access opening in the top of the projector. This projector design is disclosed in U.S. Pat. No. 3,799,665, entitled "SLIDE PROJECTOR WITH NON-SLIPPING ENDLESS SLIDE HOLDER," issued Mar. 26, 1974. In this projector, one of the shafts is driven step by step to feed succesive slides supported by the endless belt to a viewing gate for projection onto a screen.

The advantages realized by the utilization of endless flexible belts in connection with slide projectors include, among others, compact slide storage, smooth and rapid slide movement to a projector viewing gate, and generally jam-free operation by permitting slide viewing without requiring slide removal from the endless belt. Despite these advantages over the carousel-type projectors, previous endless belt projecting systems have had their own drawbacks and limitations. For example, satisfactory flexible, slide holding, endless belts have been difficult to manufacture at a reasonable cost. Additionally, prior cartridges and magazines for such belts have included numerous assembly parts and have been constructed in a manner denying the operator access to the slide while it is being viewed at the viewing gate. Such denial of slide access undesirably tends to make relatively difficult the process of slide loading in a predetermined order to provide a programmed slide show.

Accordingly, there has been a need for a novel slide projector which operates smoothly, quietly, rapidly and reliably and has the capability of eliminating or substantially reducing screen blackout time without requiring the use of accessory equipment. Additionally, there exists a need for a projector which permits the operator to remove and reload slides directly at the projector viewing gate without requiring removal of the cartridge or the activation of a slide transport mechanism. Further, a slide holding cartridge of the endless belt type is needed which is constructed of a minimal number of parts and which eliminates the need for accessories to obtain satisfactory results. Finally, there exists a significant need for an easily manufactured and economical slide projector which permits the simultaneous viewing of several slides and/or advancement of slides at an extremely rapid rate to achieve animation and/or dissolving effects. The present invention fulfills these needs and provides other related advantages.

SUMMARY OF THE INVENTION

The present invention resides in an improved slide projector and cartridge which is quiet, compact and capable of efficiently displaying slides at a rapid rate up to several slides per second. The projector comprises a projector housing including optic, control, and drive mechanisms for coordinating the movement and display of slides enclosed within a slide cartridge adapted for removable reception into the projector housing. This removable cartridge carries an endless belt which supports and transports the slides along a continuous pathway, situated upon a single horizontal plane, for presentation at one or more viewing gates.

In one preferred form of the invention, the cartridge is generally oblong in shape and the endless belt therein supports the slides for movement along a correspondingly oblong pathway. This oblong cartridge includes two projection ports formed in its side walls near one end thereof and situated generally adjacent a single viewing gate of the projector to allow the images carried by the slides to be illuminated and projected onto a screen by the projector optics. The cartridge further includes an upper access port generally above the viewing gate and between the projection ports to permit the loading and removal of the slides into slide holders on the belt directly at the viewing gate. This permits the operator to immediately view the slides as they are loaded into the cartridge without the need to remove the cartridge from the projector or to engage any mechanical slide transport apparatus to move a loaded slide to the viewing gate for projection.

Within the oblong cartridge, the endless belt is mounted upon a take-up spindle and a drive spindle. Slide holders are joined to the endless belt and carry the slides along their horizontal pathway through the cartridge for ultimate individual advancement to the viewing gate where the slides are illuminated and projected. In addition to driving the endless belt, the drive spindle indexes each slide holder and its supported slide individually and cooperates with a synchronized slide catcher device to position and hold each slide at the viewing gate at one end of the oblong pathway. With this construction, the slide at the viewing gate is rotated about 90 degrees by the drive spindle with respect to the preceding and following slides to avoid interference therewith at the viewing gate.

In another preferred form, an expanded slide cartridge includes an enlarged end and an opposite narrow end substantially enclosing a generally Y-shaped horizontal slide pathway. This expanded cartridge has two pairs of projection ports at the upper ends of the Y-shaped pathway to define two viewing gates whereat two slides may be illuminated and projected simultaneously or in rapid succession by dual lamps within a projector for projecting the images through a single lens unit. In addition, two access ports are formed in the cartridge above the viewing gates to permit the loading and removal of the slides directly at the viewing gates by the operator.

An expandable endless belt of unitary molded plastic or the like is provided within the expanded cartridge wherein one side edge of each slide holder forms a link of the belt. Interposed between each holder-formed link is a folding web which gives the belt an accordion-style flexibility for accommodating the shape of the Y-shaped pathway. The belt thus has the capability to pivot the slide holders generally about a pivot axis disposed either at the belt or generally at the outside edges of the slide holders opposite the belt.

The expanded slide cartridge includes a generally Y-shaped track for guidably supporting the belt and further includes a pair of drive spindles and a take-up spindle for driving the belt in a manner to control the movement and position of the slides as they travel through the pathway. The take-up spindle guides and drives the belt through the narrow end of the cartridge and may be rotatably driven through an idler gear assembly connected to one of the drive spindles. The two drive spindles are positioned at the upper ends of the Y-shaped track and may operate independently, either simultaneously or alternately, to drive the belt through the enlarged end of the cartridge. These drive spindles each include a toothed indexing wheel for simultaneously engaging and rigidly controlling the position of three slide holders in an approximate angularly spaced relation of about 90 degrees to each other.

Normally, the drive spindles are rotated in 180-degree increments to stop for display of every other slide at an associated one of the viewing gates and in orthogonal fixed relation to the preceding and following slides, with the two spindles adapted to stop different slides at their respective viewing gates for display. In this fashion, a slide projected at one viewing gate will not be presented at the other gate, and vice versa. This configuration of the invention, when coupled with rapid and/or varying speed slide advancement, particularly enhances the creation of animation and/or dissolving effects and permits the projected superimposition of one slide image upon another.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figures 1, 2:
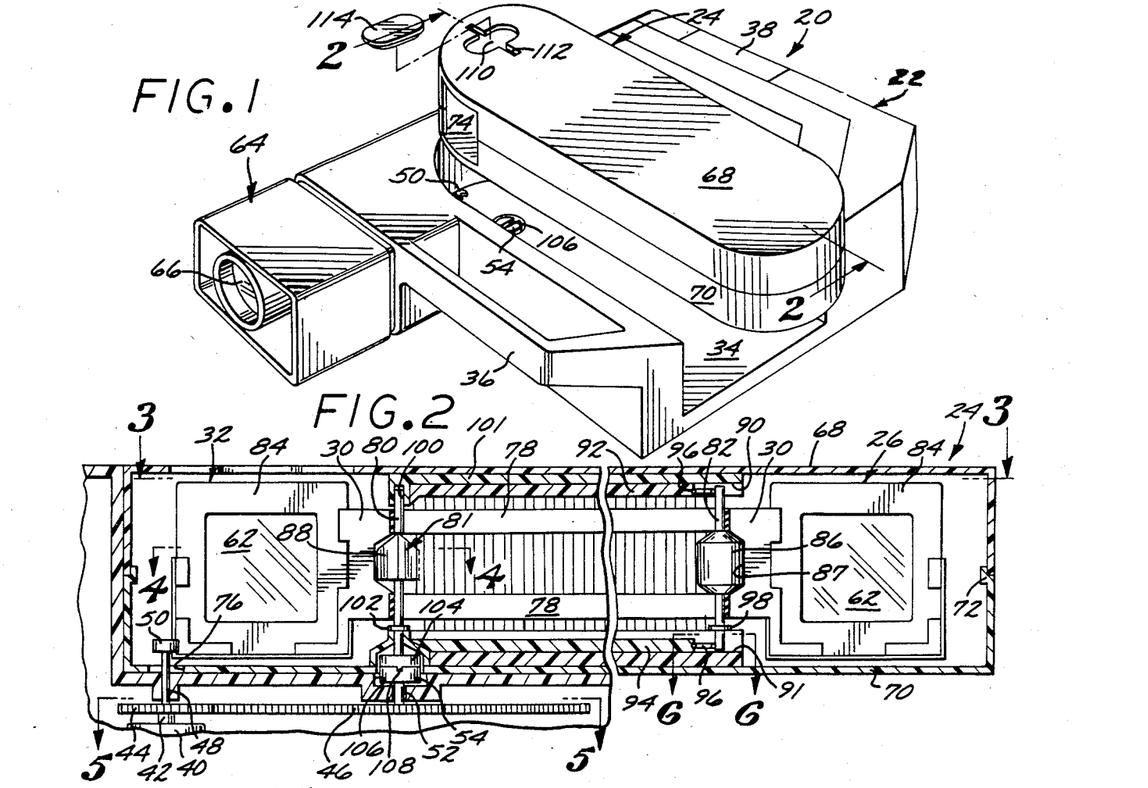
FIG. 1 is a perspective view of one preferred form of a slide projector embodying the invention and having an oblong slide cartridge shown in exploded relation with a projector housing.
FIG. 2 is an enlarged fragmented vertical section taken generally along the line 2—2 of FIG. 1, illustrating the internal components of the slide cartridge and the interaction between the cartridge and the projector housing.
Figure 3:
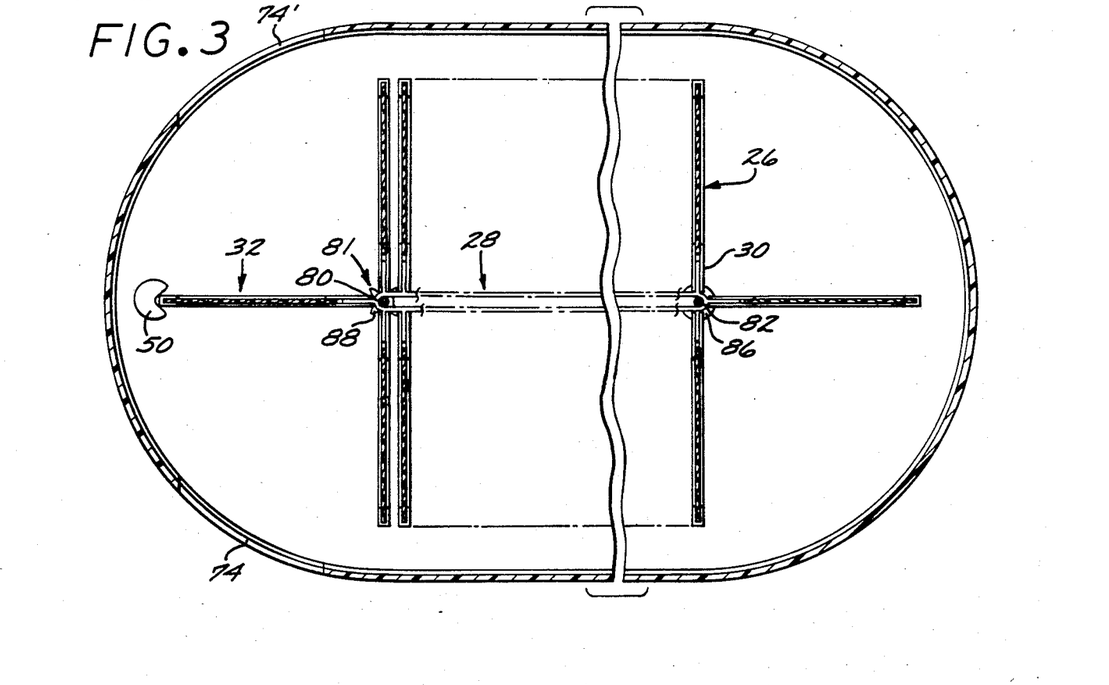
FIG. 3 is a fragmented horizontal section, shown somewhat in schematic form, taken generally along the line 3—3 of FIG. 2.
Figure 4:
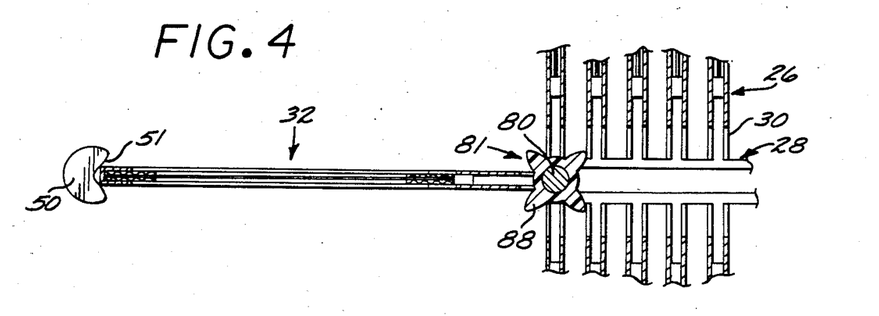
FIG. 4 is an enlarged fragmented horizontal section taken generally along the line 4—4 of FIG. 2, illustrating somewhat schematically a slide being rigidly held in a viewing gate between an indexing drive spindle and a slide catcher wheel.

As shown in the drawings for purposes of illustration, the present invention is concerned with an improved slide projector system, generally designated in FIG. 1 by the reference numeral 20. This improved slide projector system 20 comprises a compact projector housing 22 for receiving a slide cartridge 24 carrying a plurality of slides 26 (FIG. 2) each in a vertically upright position for rapid transport along a substantially horizontal pathway and for individual illumination to project their images all without requiring slide removal from the pathway.

In one preferred form, the slide cartridge 24 (FIG. 1) is generally oblong and comprises an endless belt 28 supporting a plurality of slide holders 30 which hold and move the slides 26 by the operation of a self-contained drive mechanism having a simplified interface with a projector drive means. The slides 26 travel through a substantially horizontal, oblong, pathway for presentation at a single viewing gate 32 where the slides are illuminated and their images are projected. In another preferred form, an enlarged slide cartridge 124 (FIG. 8) provides a generally Y-shaped expanded horizontal pathway for the slides 26, which are carried by slide holders 130 forming a portion of an endless belt 128. The enlarged slide cartridge 124 is designed to cause the slides to be presented individually to one of two separate viewing gates 132 and 132' for projection, thereby permitting enhanced animation, image dissolution, and speed effects as well as superimposition of two slide images upon a single projection screen. In both preferred embodiments, the slide cartridges 24 and 124 provide access ports which permit an operator to load slides directly into the viewing gates for viewing without requiring the disassembly or detachment of projector parts and further without requiring slide movement along the pathway.

The improved slide projector system of this invention is designed for rapid slide advancement along the cartridge pathway thereby making the slide projector particularly adaptable for automated, programmed operation for viewing of the slides 26 at a rapidly indexed and/or variable rate of progression. Projector set-up for programmed operation is simplified by permitting immediate viewing of a slide 26 loaded into the viewing gate to insure slide loading in a desired order for a slide show. In both embodiments, the slide cartridge supports and transports the loaded slide holders in a manner capable of rapidly indexing the slides 26 to the viewing gate, with a rate of progression to the gate which can vary up to several slides per second, without malfunction or jamming of the cartridge components thereby substantially eliminating screen blackout at times between slides and further making possible a variety of animation and/or dissolving effects. Moreover, the projector housing includes an open-sided cavity for receiving the slide cartridge which may be of extended length to accommodate larger numbers of slides for relatively long slide shows.

In accordance with the present invention, and as illustrated with respect to the first embodiment in FIGS. 1 through 7, the slide projector system 20 includes the projector housing 22 constructed from metal, plastic, or the like to have a relatively low profile and a substantially flat overall shape. The housing 22 is provided with a handle 36 to enhance its portability and appropriate controls (not shown), including a programming module 38 illustrated opposite the handle for controlling the operation of the projector drive means. A central, upwardly open and open-sided cavity 34 within the projector housing 22 is provided to receive the slide cartridge 24.

Figures 5, 6, 7:
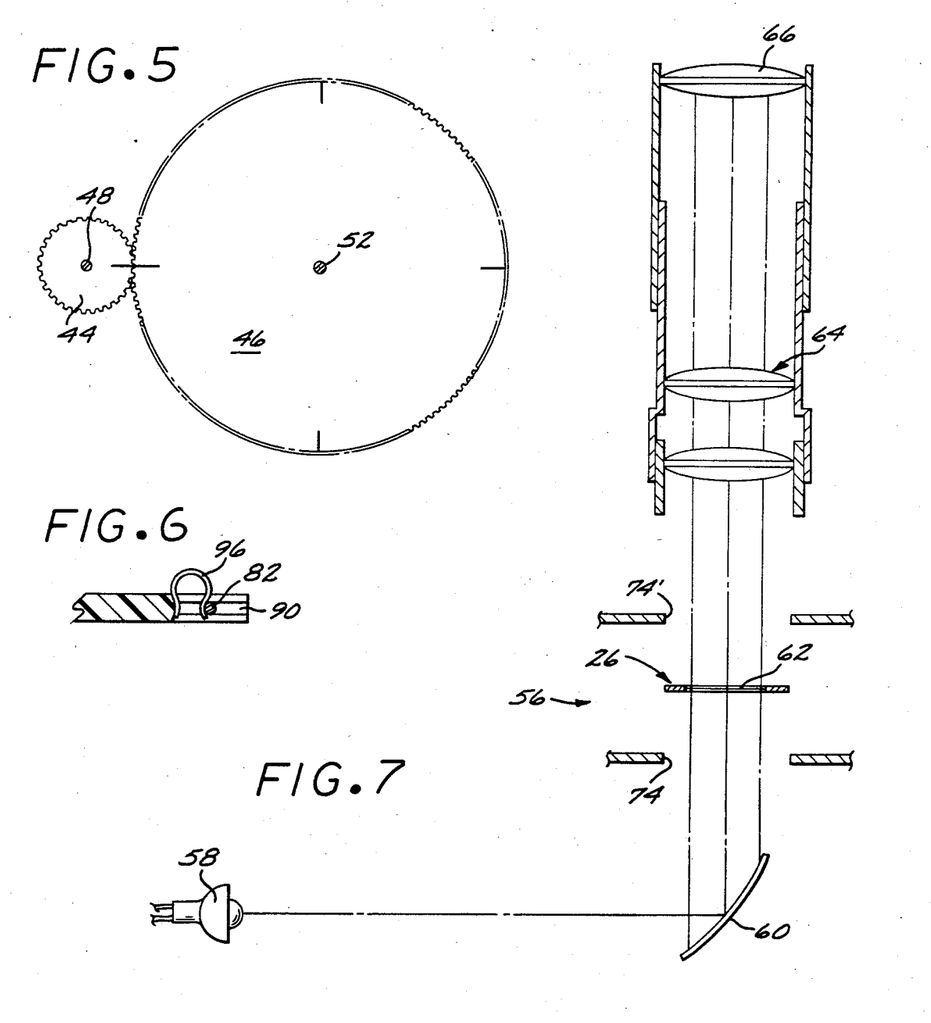
FIG. 5 is a horizontal section taken generally along the line 5—5 of FIG. 2, illustrating somewhat schematically two gears forming a portion of a driving mechanism.
FIG. 6 is an enlarged fragmented horizontal section taken generally along the line 6—6 of FIG. 2.
FIG. 7 is a schematic diagram illustrating an optical system enclosed by the projector housing.

The projector drive means includes a driving motor 40 (FIG. 2) within a lower portion of the projector housing 22 and having an outlet shaft 42 carrying a slide catcher gear 44. This gear 44 is engaged with a larger drive spindle gear 46 for simultaneous rotation of the gears 44 and 46 by the driving motor (FIG. 5). The slide catcher gear 44 also supports a slide catcher shaft 48 which extends through the projector housing 22 into the cartridge-receiving cavity 34 and is capped by a slide catcher device in the illustrative form of a wheel 50. Similarly, the drive spindle gear 46 supports a drive spindle shaft 52 which extends through the projector housing 22 into the cavity 34 and is capped in a position spaced a few inches from the wheel 50 by a drive spindle shoe wheel 54. In the illustrative embodiment, the gear ratio of the drive spindle gear 46 to the slide catcher gear 44 is four to one.

The slide catcher wheel 50 is shaped and dimensioned to approximate a disk having a tapered, slide holding recess 51 of a smoothly contoured, generally V-shaped configuration. The drive spindle shoe wheel 54 is also shaped and dimensioned to approximate a disk but has a diametric channel on its upward face in a position to interact with the slide cartridge 24 when it is placed within the open ended cavity 34, as will be described in more detail. The region between the slide catcher wheel 50 and the drive spindle shoe wheel 54 defines the viewing gate 32 whereat the slides 26 housed within the slide cartridge 24 are presented for illumination and projection by an optical system 56 substantially enclosed within the projector housing 22.

The optical system 56, which is schematically illustrated in FIG. 7, includes a light source in the form of a lamp 58 which produces light reflected by a condensing mirror 60 to illuminate a slide 26, including a conventional image transparency 62 at the viewing gate 32. The image projected from the slide 26 is focused through a lens unit 64 which may include a zoom lens component 66 to enhance the utility and overall flexibility of the improved slide projector system 20.

In the present configuration, the slide catcher wheel 50 and the drive spindle shoe wheel 54 are situated generally at a closed end of the cartridge-receiving cavity 34 so that the viewing gate 32 is properly aligned with the optical system 56. In this regard, the slide cartridge 24 is generally oblong in shape with dimensions to fit easily but closely within the cavity 34. The cartridge 24, when received into the cavity 34, extends from the region of the viewing gate 32 generally toward the open side of the cavity to terminate generally at one side margin of the projector housing 22. However, since the size of the slide cartridge has a direct effect upon the number of slides which the cartridge contains, the length of the cartridge can be increased or decreased as desired to correspondingly increase or decrease the length of a slide show.

The slides 26 are carried within the cartridge 24 by an endless belt 28 supporting a plurality of slide holders 30. This endless belt is supported for driven engagement with the drive spindle shoe wheel 54 to advance the slide holders 30 and thus the slides 26 along an oblong horizontal pathway within the cartridge ultimately to present each slide individually at the viewing gate 32.

More specifically, the slide cartridge 24 comprises an upper protective encasement 68 shaped to fit over a lower protective encasement 70. As best illustrated in FIG. 2, the protective encasements 68 and 70 enclose the flexible endless belt 28 which carries the slides 26 together with associated belt driving components for driven engagement with the drive spindle shoe wheel 54 to guide and propel the slides through their generally oblong horizontal pathway within the cartridge 24. The protective encasements 68 and 70 are conveniently formed from a lightweight molded plastic or the like, and, when joined together, they form an oblong chamber and define the outer boundaries of the cartridge 24. The lower protective encasement 70 includes a step 72 along its upper outer edge which provides a stable point of attachment with a lower outer edge of the upper protective encasement 68, as by a friction fit to permit opening of the cartridge as desired or by a fixed connection using an adhesive cement in the event a permanently closed cartridge is desired.

Additionally, the protective encasements 68 and 70 cooperate to form a pair of vertical projection ports 74 and 74' in the cartridge side walls in a position bracketing the viewing gate 32. These projection ports 74 and 74' are aligned with the optical system 56 of the projector, as viewed in FIG. 7, to pass light from the lamp 58 and thereby illuminate the transparency 62 of the slide 26 positioned at the viewing gate 32 for projection of the slide images through the lens unit 64. Morover, a port 76 is provided through the base of the lower protective encasement 70 which permits the slide catcher wheel 50, the function of which will be more fully described hereinafter, to be inserted into the cartridge 24 when the cartridge is placed into the projector housing cavity 34.

The flexible endless belt 28 is centrally perforated to include upper and lower endless parallel bands 78 which are supported by a drive spindle 80 and a take-up spindle 82. The slide holders 30 are joined to the parallel bands 78 so that the slide holders are attached perpendicular to the length of the bands, and the travel path of the slide holders through the cartridge 24 about the spindles 80 and 82 defines the oblong horizontal pathway of the slides 26. In the illustrated embodiment, the parallel bands 78 and the slide holders 30 are a single, unitary molded component of flexible plastic or the like with the slide holders displayed along the length of the bands 78 in slightly spaced relation to one another. The slide holders 30 are dimensioned to firmly hold and transport the slides 26 within the cartridge 24, and more particularly the slide holders securely grasp paperboard frames 84 which surround and border the image transparencies 62.

The endless belt 28, which comprises the parallel belt bands 78 and the attached slide holders 30, is propelled and guided by the spindles 80 and 82 in such a manner that the slide holders are successively individually positioned at the viewing gate 32 while adjacent slides 26 are positioned out of the illumination and projection path of the optical system 56. The take-up spindle 82 includes an enlarged, centrally located guide roller 86 which fits into conforming recesses 87 in the slide holders 30 to precisely position the slide holders as they travel along the portion of the oblong horizontal pathway about the take-up spindle. The parallel belt bands 78 of the endless belt are spaced from one another so that they ride upon the take-up spindle 82 on each side of and adjacent the take-up spindle guide roller 86.

The drive spindle 80 supports a central drive wheel 81 having four indexing arms 88 sized to project into the spaces between the slide holders 30 to engage the slide holders 30 and individually position the slides 26 at the viewing gate 32 in cooperation with the slide catcher wheel 50. More particularly, as the drive spindle 80 turns, one of the indexing arms 88 contacts one slide holder 30 and rotates it about the drive spindle axis until the free vertical edge of the slide holder is engaged with the recess 51 of the slide catcher wheel 50. In a manner similar to the take-up spindle 82, the drive wheel 81 is situated on the drive spindle 80 to also control the vertical positioning of the belt assembly in that the parallel belt bands 78 ride on the drive spindle on each side of and adjacent the indexing arms 88.

The ends of the take-up spindle 82 are received into channels 90 and 91 formed in an upper casing 92 and a lower casing 94 which are retained between the upper protective encasement 68 and the lower protective encasement 70, respectively. These channels 90 and 91 provide an abutment for a pair of belt tension springs 96 which are positioned to urge the take-up spindle 82 away from the drive spindle 80 for maintaining a tension on the parallel belt bands 78. Additionally, a retainer 98 situated on the take-up spindle 82 provides an enlarged rotating surface which interfaces with the lower casing 94 to provide the vertical support for the take-up spindle.

The drive spindle 80 is positioned by a boss 100, situated in an upper cap 101, which receives the upper portion of the drive spindle therein, and a vertically aligned intruding aperture of the lower protective encasement 70, which permits the lower portion of the drive spindle to extend therethrough. A drive spindle retainer 102 similar to the take-up spindle retainer 98 is positioned on the lower portion of the drive spindle 80 to provide an enlarged rotating surface interfacing with the lower protective encasement 70 and it additionally serves to limit the longitudinal displacement of the drive spindle.

The lower portion of the drive spindle 80, which extends through the intruding aperture of the lower protective encasement 70, is rigidly attached to a foot wheel 104 generally positioned within a foot wheel recess 106 formed in the lower protective encasement. The foot wheel 104 includes a downwardly projecting tooth 108 (FIG. 2) spanning the diameter of the foot wheel 104 which is positioned to be received by the diametric channel on the upward face of the drive spindle shoe wheel 54. Accordingly, rotation of the shoe wheel 54 by the driving motor 40 imparts forces through the foot wheel 104 to the drive spindle 80 for moving the endless belt 28 through the oblong horizontal pathway.

When the slide cartridge 24 is correctly positioned upon the projector housing 22 within the open-sided cavity 34, the slide catcher wheel shaft 48 extends into the cartridge through the slide catcher port 76 in the lower protective encasement 70, whereas the foot wheel 104 mates with the shoe wheel 54. The controls (not shown) on the projector housing 22 permit operation of the driving motor 40 to make one complete turn of its outlet shaft 42 when the operator desires to change from one slide to the next. Through the interface of the slide catcher gear 44 and the drive spindle gear 46, a complete clockwise turn of the slide catcher gear causes a one-quarter counterclockwise turn of the drive spindle gear. This causes the slide 26 being held in the viewing gate 32 to rotate out of the viewing gate 90 degrees while simultaneously turning the trailing subsequent slide into the viewing gate by action of one of the indexing arms 88 on the spindle drive wheel 81. The outer side edge of the slide moved to the viewing gate is captured by the slide catcher wheel 50 which rotates through one complete turn as the drive spindle 80 rotates through one-quarter turn. Importantly, the indexing arms 88 of the drive wheel 81 help to support the slides immediately preceding and following the slide at the viewing gate in out-of-the-way positions where they will not interfere with the optical system 56.

Finally, a viewing gate access port 110 in the upper protective encasement 68 is positioned above the viewing gate 32. This access port 110 allows the projector operator to load or remove slides directly at the viewing gate 32 and thereby permit immediate viewing of the slides during loading. In this regard, the access port 110 is oblong in shape with a size to permit the insertion of the operator's fingers on opposite sides of a slot 112 oriented centrally and transversely to the length of the access port for passing the slides 26 through the upper protective encasement 68. A closure cap 114 is conveniently provided for snap-fit reception into and over the access port 110 subsequent to a loading procedure.

From the foregoing, it is evident that the improved slide projector system 20 can be economically and inexpensively manufactured in comparison with other similar products on the market. This system 20 is capable of very rapid movement of the slides 26 into and out of the viewing gate 32 thereby substantially reducing or eliminating screen blackout. Additionally, extended slide shows can be programmed to self-execute at a rapid and/or variable display rate utilizing the programming module 38 and a cartridge 24 of selected length.

These foregoing features are enhanced and magnified in a second embodiment of the invention, illustrated in FIGS. 8 through 17, wherein functionally equivalent components common to the first and second embodiments are referred to in the drawings by corresponding reference numbers increased by 100. Generally, the second embodiment includes an enlarged slide cartridge 124 (FIG. 8) providing a Y-shaped, expanded horizontal pathway for the slides 26 which are carried by slide holders 130 forming a portion of an expandable endless belt 128. The enlarged slide cartridge 124 is designed to present the slides 26 individually at one of two separate viewing gates 132 and 132" for projection, thereby permitting enhanced animation, image dissolution, and speed effects, as well as superimposition of two slide images upon a single projection screen. Additionally, the slide cartridge 124 provides two access ports 210 and 210' which permit an operator to load the slides 26 directly into the viewing gates 132 and 132' for viewing without requiring the disassembly or detachment of projector parts and further without requiring slide movement along the pathway.

Figures 8, 9, 10:
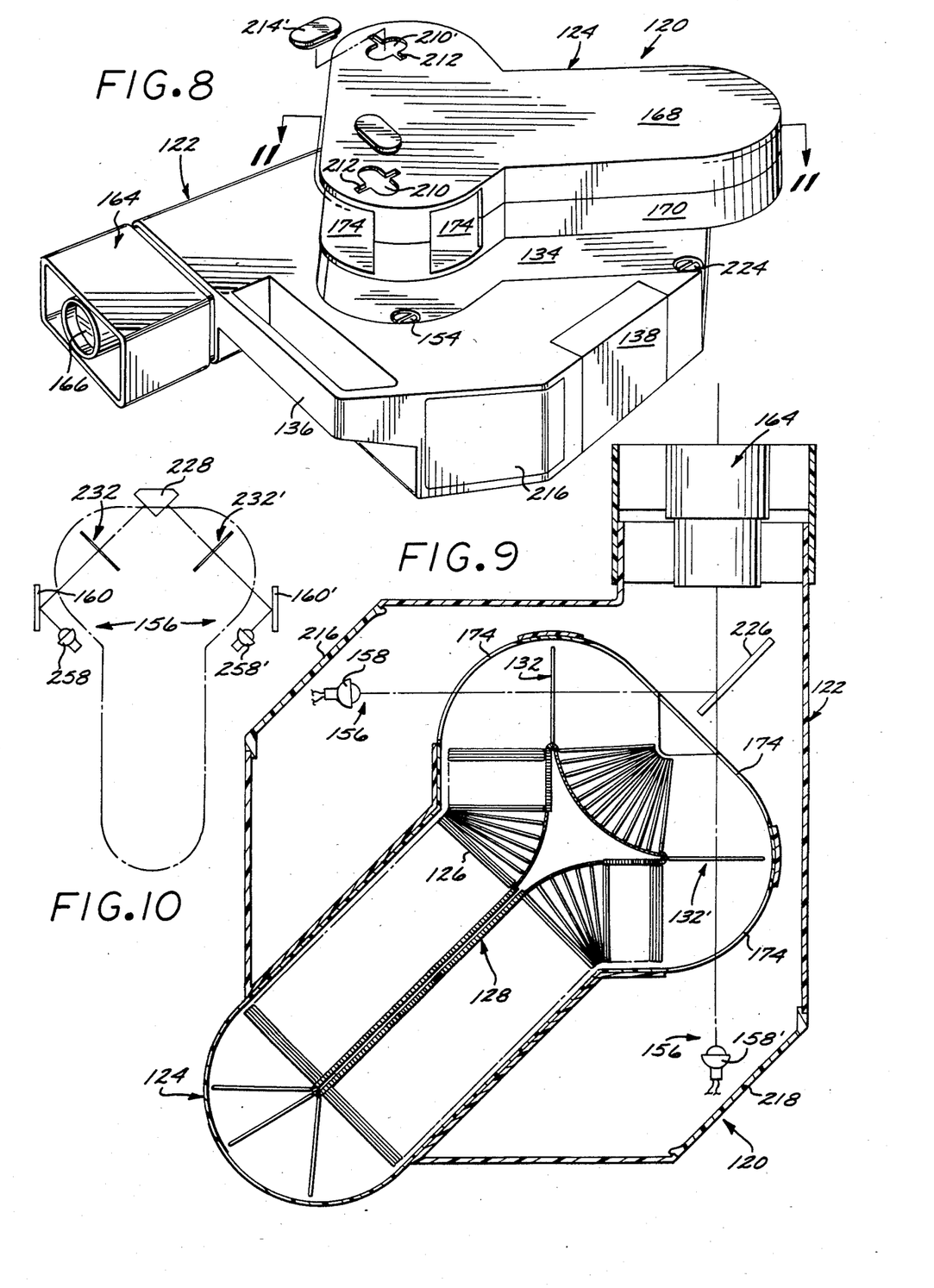
FIG. 8 is a perspective view of an alternative preferred form of the invention including an enlarged slide cartridge shown in exploded relation with a projector housing.
FIG. 9 is a somewhat schematic plan view of the projector housing and cartridge of FIG. 8, illustrating slides positioned at two separate viewing gates for projection through a single lens unit.
FIG. 10 is a schematic diagram illustrating an alternate optical system to that illustrated in FIG. 9.

In accordance with the second preferred form of the present invention, an alternative enlarged slide projector system 120 includes an enlarged projector housing 122 constructed from metal, plastic, or the like to have a relatively low profile and a substantially flat overall shape (FIG. 8). The housing 122 is provided with a convenient carrying handle 136, an open-sided cavity 134 for receiving the enlarged slide cartridge 124 which may be of extended length to accommodate large numbers of slides for relatively long slide shows, two lamp access covers 216 and 218, a programming module 138, and appropriate additional controls (not shown) for controlling the operation of a projector drive means.

Figure 17:
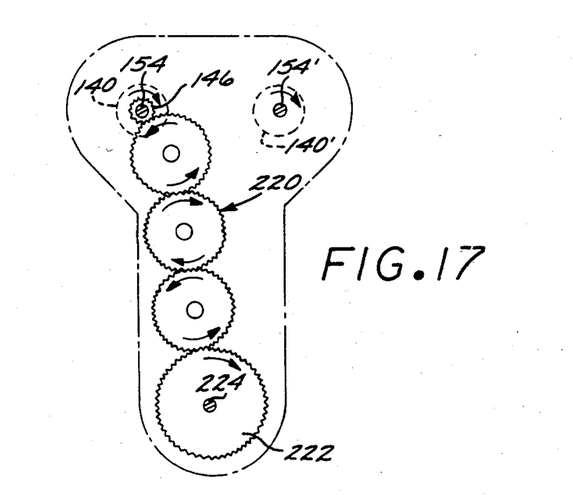
FIG. 17 is a schematic diagram illustrating an idler gear assembly connected between one drive spindle and take-up spindle.

The projector drive means is generally enclosed within a lower region of the projector housing 122, in the same manner as described with respect to the drive motor 40 of the first embodiment, and includes two independently actuable driving motors 140 and 140' depicted schematically in FIG. 17. These driving motors 140 and 140' are respectively coupled to upwardly projecting shafts 152 and 152' that extend through the projector housing 122 into the open-sided cartridge-receiving cavity 134. Drive spindle shoe wheels 154 and 154' are secured to the upper ends of these shafts, each to include a diametric channel in its upward face, in positions to drivingly interact with the slide cartridge 124 when it is placed into the cavity 134.

The shaft 154 driven by the first driving motor 140 supports and turns a rigidity attached drive spindle gear 146 disposed beneath the cartridge-receiving cavity 134. This spindle gear 146 in turn is meshed with and drives an idler gear assembly 220 (FIG. 17). The idler gear assembly 220 interfaces with a take-up spindle drive gear 222 for turning a take-up spindle shoe wheel 224 simultaneously with the driving movement of the first spindle shoe wheel 154. The sizing and dimensioning of the take-up spindle shoe wheel 224 is generally similar to that of the drive spindle shoe wheels 154 and 154', and the take-up shoe wheel is attached to the take-up spindle drive gear 222 by an extension of the shaft 224 extending through the housing 122 in the cavity 134.

The regions generally adjacent the first drive shoe wheel 154 and the second drive shoe wheel 154' which are situated within the illumination path of an expanded optical system 156 define the viewing gates 132 and 132' respectively whereat the slides 26 housed within the slide cartridge 124 are presented for illumination and projection. This expanded optical system 156 utilizes components very similar to those illustrated in connection with the first embodiment (FIG. 7). More particularly, within the enlarged housing 122, two lamps 158 and 158' are mounted to direct light respectively through the viewing gates 132 and 132', as shown in FIG. 9. The paths of light from the lamps intersect at a beamsplitter 226 employed to permit passage of light from the lamp 158' and to reflect light from the lamp 158 along a common axis to be focused through a single lens unit 164. Alternatively, for increased housing compactness, the optical system can be designed as viewed in FIG. 10 so that the light emanating from two lamps 258 and 258' is reflected from a pair of mirrors 160 to pass through two viewing gates 232 and 232' and then be refracted through a prism 228 for passage through a single lens unit (not shown).

In the present configuration, the drive spindle shoe wheels 154 and 154' are situated generally at the closed end of the cartridge-receiving cavity 134 so that the viewing gates 132 and 132' are properly aligned with the optical system 156. This closed end of the cavity 134 is shaped to receive the enlarged or upper ends of the Y-shaped cartridge 124 such that the narrower or base end of the cartridge projects toward the take-up spindle shoe wheel 224. As in the first embodiment, the narrower end of the cavity 134 is open-sided to accommodate slide cartriges of varying length which in turn carry different numbers of slides, depending upon the length desired for a slide show.

Within the enlarged slide cartridge 124, the slides 26 are carried by the expandable endless belt 128 which includes the slide holders 130. The endless belt conforms to and guides its slide holders 130 along the Y-shaped horizontal pathway within the cartridge to present each slide 26 individually at either the first viewing gate 132 or the second viewing gate 132'.

More specifically, as in the first embodiment, the slide cartridge 124 comprises an upper protective encasement 168 shaped to fit over a lower protective encasement 170. The protective encasements 168 and 170 enclose the expandable endless belt 128 which carries the slides 26 together with associated belt driving components for driven engagement with the drive spindle shoe wheels 154 and 154' and the take-up spindle shoe wheel 224 to guide and propel the slides through their generally Y-shaped horizontal pathway within the cartridge 124. The protective encasements 168 and 170 are conveniently formed from a lightweight molded plastic or the like, and, when joined together, they form a generally Y-shaped chamber and define the outer boundaries of the cartridge 124.

Additionally, the protective encasements 168 and 170 cooperate to form a plurality of projection ports 174 in the cartridge side walls which are situated in positions bracketing the viewing gates 132 and 132'. These projection ports 174 are aligned with the optical system 156 of the projector 120 to pass light from the lamps 158 and 158' through the cartridge 124 for illuminating the transparencies 62 of the slides 26 positioned at the viewing gates 132 or 132'.

Figure 14:
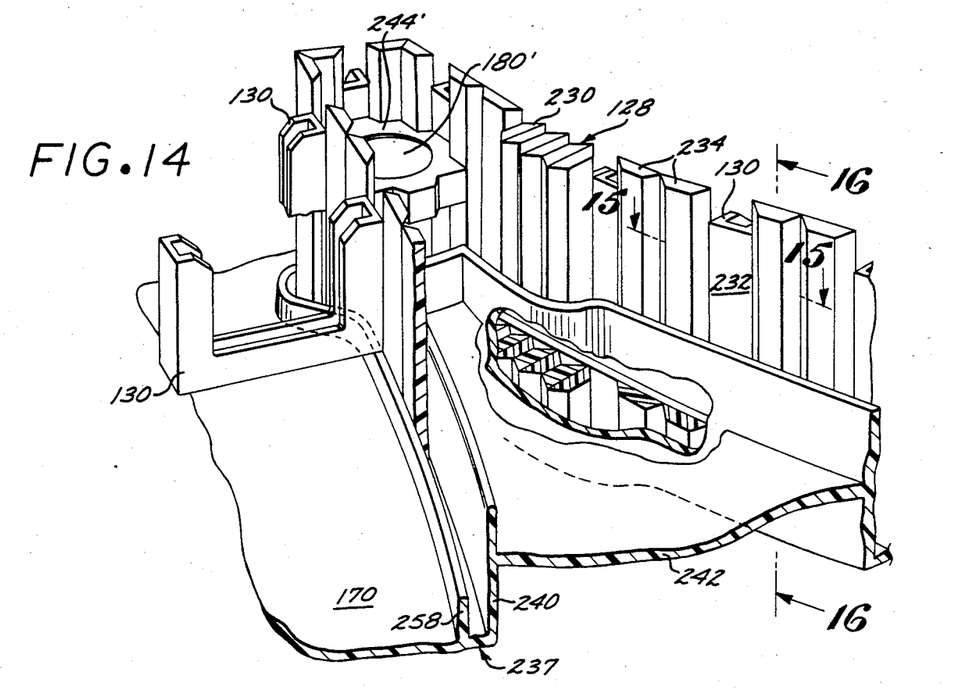
FIG. 14 is an enlarged fragmented perspective view illustrating one drive spindle and adjacent portions of a track guiding an endless expandable belt within the enlarged cartridge, generally as viewed along arrow 14 in FIG. 11.
Figure 15:
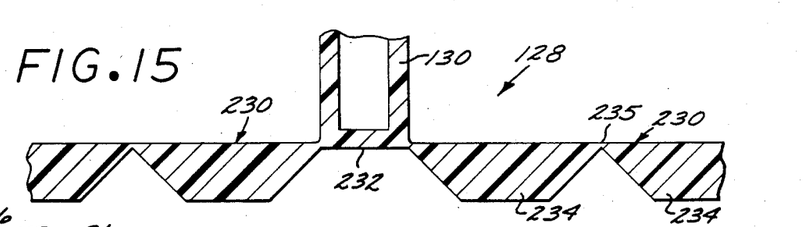
FIG. 15 is an enlarged fragmented vertical section taken generally along the line 15—15 of FIG. 14, illustrating further details of the expandable belt.

The expandable belt 128 preferably comprises an integrally molded unit comprising generally a folding web 230 interposed between the edges 232 of adjacent slide holders 130, as shown best in FIGS. 14 and 15. The edges 232 of the slide holders 130 form nonexpanding links in the belt 128 which are connected on both sides to the folding webs 230 in such a manner that the slide holders rotate about their points of attachment to the webs. The folding webs 230 in turn are each formed from two bars 234 each having a generally trapezoidal cross-section and separated by thin side margins 235 to permit the bars to pivot about their points of attachment to one another. With this construction, the web bars 234 can be collapsed or expanded to increase or decrease the length of the belt 128. The web bars 234 have lengths to extend above and below the upper and lower margins of the slide holders 130 to fit into upper and lower channel-like tracks 236 and 237 formed respectively in an upper track-forming cap 169 beneath the upper encasement 168 and the lower encasement 170 to define the Y-shaped pathway and to guide the belt 128 along the pathway.

Figure 16:
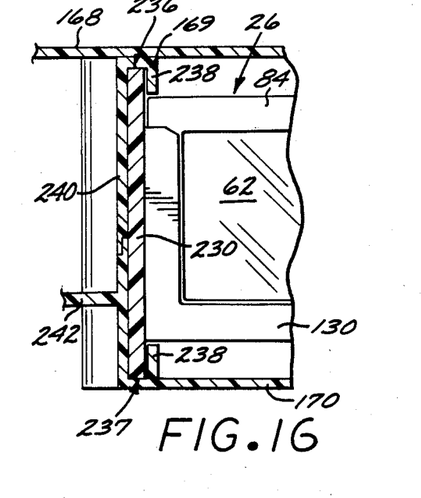
FIG. 16 is an enlarged fragmented horizontal section taken generally along the line 16—16 of FIG. 14.

The tracks 236 and 237 precisely control the movement, positioning, and flexation of the expandable belt 128 as it carries the slides 26 through the unique Y-shaped pathway. Each track 236 and 237 comprises a short outboard vertical wall 238 and a taller inboard vertical wall 240 spaced in parallel relation to one another extending in a direction generally from the respective protective encasement 168 and 170 (FIGS. 14 and 16). A horizontal brace 242 forming a portion of the lower protective encasement 170 conveniently spans the internal surfaces of the inboard walls 240 to provide increased stability and rigidity to the cartridge.

Figure 11:
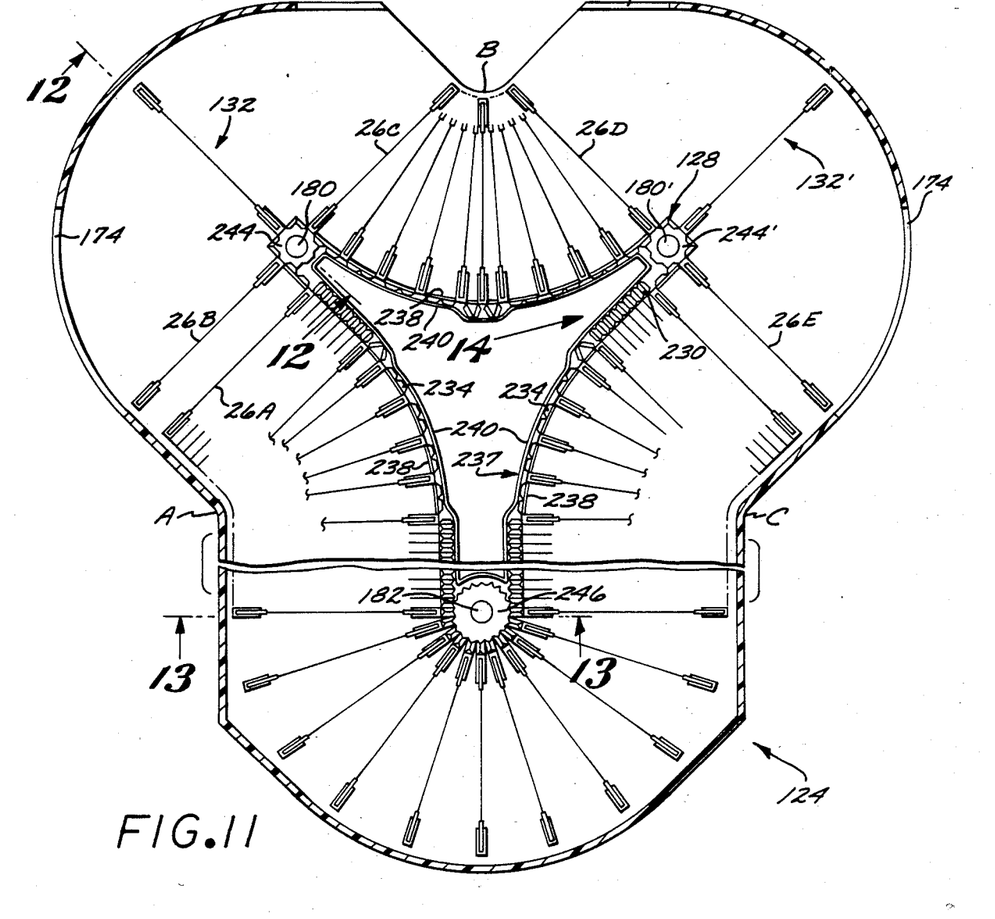
FIG. 11 is an enlarged fragmented horizontal section taken generally along the line 11—11 of FIG. 8, illustrating a generally Y-shaped horizontal slide pathway within the enlarged cartridge.
Figure 12:
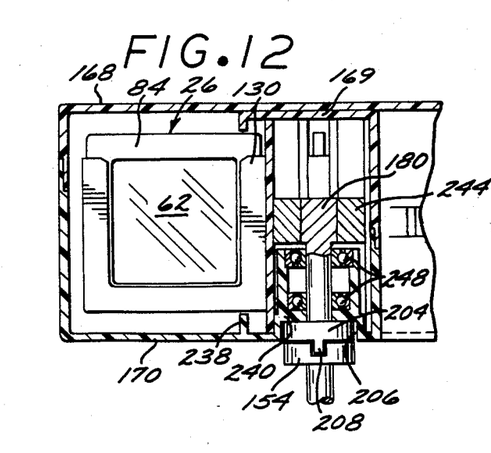
FIG. 12 is an enlarged fragmented vertical section taken generally along the line 12—12 of FIG. 11, illustrating a drive spindle rigidly holding a slide at one viewing gate.
Figure 13:
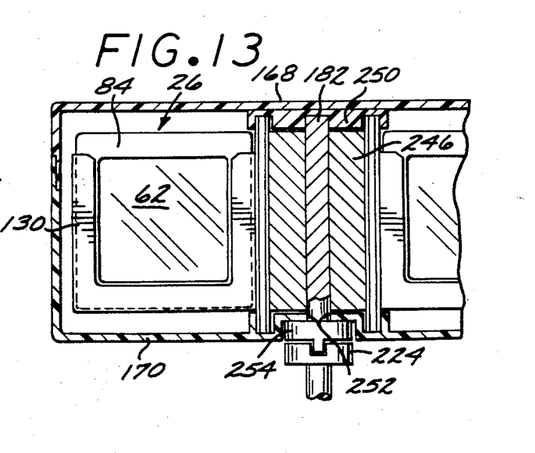
FIG. 13 is an enlarged fragmented vertical section taken generally along the line 13—13 of FIG. 11, illustrating a take-up spindle within the enlarged cartridge.

As illustrated best in FIGS. 11 through 13, the tracks 236 and 237 have vertically aligned narrow sections and wider sections which facilitate the correct operation of the expandable belt 128. The narrow sections of the tracks are positioned to facilitate the end-to-end expansion of the folding webs 230 through the bends of the track with the exception of the bend around a take-up spindle 182. The wider sections of the tracks permit the webs 230 to fold face-to-face thereby closely stacking the slide holders 130 through linear portions of the track and around the take-up spindle 182. This unique track configuration and the expandable belt 128 provide for the compact storage of the slides 26 within the expanded cartridge 124, yet it ensures reliable operation of the expanded slide projector 120 and smooth flow of the slides along the Y-shaped horizontal pathway. Auxiliary belt drive wheels (not shown) or other appropriate components can be provided, if desired, at junctions of imcreasing or decreasing track width to assure track transition from one region to another.

The expandable belt 128 rides upon and is propelled by a first drive spindle indexing and positioning member 244 on a drive spindle 180, a second drive spindle indexing and positioning member 244' on a drive spingle 180', and a take-up spindle indexing and positioning member 246. The drive spindle indexing and positioning member 244 and 244' are identical units having a circumferential array of flat faces which interact with the expandable belt 128. Four of these flat faces are arranged orthogonally about the associated drive spindle and perpendicular to horizontal radial lines from the drive spindles. These four faces contact the inboard edges 232 of the slide holders 130 to rigidly hold and position the slide holders. Each adjacent pair of these faces are separated by an orthogonal disposed pair of corner faces designed to contact, support, and guide two adjacent faces of the trapezoidal web bars 234. The take-up spindle indexing and positioning member 246, on the other hand, comprises twenty equangularly arranged indexing spikes, each having two flat vertical faces for engaging the webs 230. Each flat vertical face of the indexing spikes engage a non-parallel face of the trapezoidal web bars 234 in such a manner that each spike contacts and helps to position two folding webs 230.

The drive spindle indexing and positioning members 244 and 244' are securely mounted on upper portions of the first drive spindle 180 and a second drive spindle 180', respectively, for engaging the expandable belt 128 to precisely index, position, and control the movement of six web bars 234 and three slide holders 130 at any one time. The drive spindles 180 and 180' each rotate within a bearing 248 positioned within the lower protective encasement 170, and the lower ends of the spindles extend through the lower encasement and support a drive spindle foot wheel 204, similar to that illustrated in the first embodiment, generally positioned within a recess underneath the lower protective encasement (FIG. 12).

The take-up spindle indexing and positioning member 246 is similarly mounted on the upper portion of the take-up spindle 182 for engaging the expandable belt 128 to precisely index, position, and control the movement of a plurality of web bars 234 and slide holders 130 at any one time. The upper portion of the take-up spindle 182 is positioned within a receiving boss 250 formed in the upper cap 169 (FIG. 13) and the lower portion of the take-up spindle extends through an aperture 252 in the lower protective encasement (FIG. 13). A take-up spindle foot wheel 254 is attached to the lower terminal end of the take-up spindle 182 and positioned within a recess underneath the lower encasement 170 in a manner nearly identical to the drive spindle foot wheels 204.

When the slide cartridge 124 is correctly positioned upon the projector housing 122 within the open-sided cavity 134, the drive spindle foot wheels 204 mate with the drive spindle shoe wheels 154 and 154' and the take-up spindle foot wheel 254 mates with the take-up spindle shoe wheel 224 for the purpose of imparting rotation from the projector drive means to the spindles 180, 180', and 182 to thereby move the slide holders 130 through the Y-shaped horizontal pathway. The controls of the enlarged slide projector 120 provide that each time one of the independent driving motors is actuated, its shaft is turned 180 degrees and through the interaction of the shoe wheels 154 and 154' and their respective foot wheels 254 the associated drive spindle is likewise rotated for the purpose of presenting every other slide holder 130 at the adjacent viewing gate.

Furthermore, the expandable belt 128 is positioned upon the drive spindles 180 and 180' so that the slides presented at the first viewing gate 132 will not be presented at the second viewing gate 132' and vice versa. For example, a slide holder 130 presented at the first viewing gate 132 will travel along the Y-shaped horizontal pathway until it is positioned adjacent and 90 degrees from the second viewing gate 132'. When the second drive spindle motor 140' moves the second drive spindle 180' a one-half turn, this slide holder 130 will be rotated past the second viewing gate 132' to a position diametrically opposite its first position with respect to the second drive spindle.

Finally, a pair of viewing gate access ports 210 and 210' in the upper protective encasement 168 is positioned above the viewing gates 132 and 132'. As was the case in the first embodiment, these access ports 210 and 210' allow the projector operator to load or remove the slides 26 directly at the viewing gates 132 and 132' and thereby permit immediate viewing of the slides during loading. In this regard, the access ports 210 and 210' are oblong in shape with a size to permit the insertion of the operator's fingers on opposite sides of a slot 212 associated with each port and oriented centrally and transversely to the length of the access port for passing the slides 26 through the upper protective encasement 168. A pair of closure caps 214 and 214' is also conveniently provided for snap-fit reception into and over the access ports 210 and 210' subsequent to a loading procedure.

In operation, the folding webs 230 move through the linear portions of the tracks 236 and 237 adjacent the take-up spindle 182 while folded face-to-face, expanding slightly when engaged by the take-up spindle indexing and positioning member 246. As the slide holders 130 move from the take-up spindle 182 toward the first drive spindle 180, the tracks 236 and 237 narrow and the webs 230 expand end-to-end for the slide holders to make a turn with a pivot point "A" generally about the opposite side of the slide holder edges 232. After making this turn, the webs 230 fold up face-to-face again within a straight, widened part of the tracks 236 and 237 where the slide holders 13 stack against a slide 26A which is roughly held in place by a fixed slide 26B (FIG. 11).

The drive spindle indexing and positioning member 244 is shaped to unfold the belt 128 as it moves around the drive spindle 180. The positioning member 244 holds three slide holders 130 rigidly with adjacent slide holders positioned at right angles to one another and with the two connecting webs 230 between the three rigidly held slide holders positioned by the positioning member so that their outer faces are at right angles to one another. One of the slide holders 130 is positioned in the first viewing gate 132 for illumination and projection through the optical system 156.

Through the upper portion of the Y-shaped pathway between the drive spindles 180 and 180', a leading slide 26C adjacent the gate 132 cooperates with a trailing slide 26D adjacent the gate 132' to retain a group of slides within this curved portion of the pathway. The tracks 236 and 237 are generally narrow through this upper portion of the pathway causing the webs 230 to be expanded end-to-end for the slide holders 130 to make a turn with a pivot point "B" generally about the opposite side of the slide holder edges 232. Located centrally within this portion of the pathway is a widened track channel for stacking the slides 26 which permits the number of slides between the drive spindles 180 and 180' to vary. This allows for the simultaneous or nonsimultaneous operation of the drive motors 140 and 140' as programmed.

The second drive spindle indexing and positioning member 244' works like the first to rigidly hold three slide holders 130 and position one within the second viewing gate 132'. The rigidly held slides adjacent the one held in the viewing gate 132' act to hold other slides out of the illumination and projection path of the optical system 156. Once released from the second positioning member 244', the webs 230 move from a widened portion of the tracks 236 and 237 through a narrower portion where the slide holders 130 pivot about a pivot point "C" generally mirroring the pivot point "A" until the webs 230 once again stack up in a folded, face-to-face manner adajcent the take-up spindle 182.

From the foregoing it is to be appreciated that the improved slide projector 120 is capable of operating smoothly, quietly, rapidly, and reliably by eliminating screen blackout without requiring the attachment of one or more accessories. Additionally, the improved projector 120 permits the operator to remove and reload the slides 26 directly into the viewing gate and without requiring the removal of the cartridge 124 or the activation of a mechanical slide transport assembly. Alternatively, in either embodiment, the cartridge can be opened for slide loading and/or removal without disturbing mounting of the endless belt. Further, the invention particularly enhances the creation of animation effects, and it permits the superimposition of one slide upon another.

Although two particular embodiments of the invention have been described in detail for purposes of illustration, various modifications of each may be made without departing from the spirit and scope of the invention. For example, the expandable belt of the emboidment depicted in FIGS. 8-17 can be utilized in the embodiment of FIGS. 1-7 in the event a great stacking density of slides is desired at positions along the pathway other than at the viewing gate. Accordingly, the invention is not to be limited, except as by the appended claims.

What is claimed is:

1. A slide projector assembly, comprising:
   a projector housing having an open-sided and upwardly open cavity formed therein;
   drive means within said projector housing and extending into said cavity at a position generally opposite the open side of said cavity and generally adjacent a projector viewing gate;
   optical means within said projector housing for providing a source of light illuminating said viewing gate; and
   a slide cartridge for reception into said cavity, said slide cartridge including a cartridge housing enclosing an endless belt including means for carrying a plurality of slides along a generally horizontal pathway, driven means supporting said endless belt and for engagement by said drive means when said cartridge is received into said cavity, said drive means being for driving said driven means for transporting said endless belt in steps, said driven means being for indexing the slides one at a time to said viewing gate for illumination by said optical means, and an excess port formed in said cartridge housing generally over said viewing gate to permit, when said slide cartridge is received within said cavity, loading of a slide into said cartridge housing at a position directly at said viewing gate and to permit removal of a slide from within said cartridge housing when said slide to be removed is at said viewing gate.

2. The slide projector assembly of claim 1 wherein said driven means comprises a take-up spindle and a drive spindle for supporting said endless belt within said cartridge housing and for guiding said belt through the horizontal pathway, said drive spindle being rotatably driven in steps by said driven means and including a toothed drive member in engagement with said belt for indexing said belt in steps for indexing the slides one at a time to said viewing gate.

3. A slide projector assembly, comprising:
   a projector housing having an open-sided and upwardly open cavity formed therein;
   drive means within said projector housing and extending into said cavity at a position generally opposite the open side of said cavity and generally adjacent a projector viewing gate;
   optical means within said projector housing for providing a source of light illuminating said viewing gate; and
   a slide cartridge for reception into said cavity, said slide cartridge including a cartridge housing enclosing an endless belt including means for carrying a plurality of slides along a generally horizontal pathway, driven means supporting said endless belt and for engagement by said drive means when said cartridge is received into said cavity, said drive means being for driving said driven means for transporting said endless belt in steps, said driven means being for indexing the slides one at a time to said viewing gate for illumination by said optical means, and an access port formed in said cartridge housing generally over said viewing gate to permit loading of a slide directly at said viewing gate;
   said driven means comprising a take-up spindle and a drive spindle for supporting said endless belt within said cartridge housing and for guiding said belt through the horizontal pathway, said drive spindle being rotatably driven in steps by said driven means and including a toothed drive member in engagement with said belt for indexing said belt in steps for indexing the slides one at a time to said viewing gate;
   said drive means comprising a drive shoe wheel generally at one side of said gate for driven coupling with said drive spindle, and a slide catcher device generally at an opposite side of said gate, said toothed drive member and said catcher wheel cooperating to support opposite sides of said slide at said gate.

4. The slide projector assembly of claim 1 wherein said belt includes slide holders for carrying the slides along the horizontal pathway.

5. The slide projector assembly of claim 2 including a belt tension spring for moving said take-up spindle relative to said drive spindle to take up any slack in said endless belt.

6. A slide projector assembly, comprising:
   a projector housing having an open-sided and upwardly open cavity formed therein;
   drive means within said projector housing and extending into said cavity at a position generally opposite the open side of said cavity and generally adjacent a projector viewing gate;
   optical means within said projector housing for providing a source of light illuminating said viewing gate; and
   a slide cartridge for reception into said cavity, said slide cartridge including a cartridge housing enclosing an endless belt including means for carrying a plurality of slides along a generally horizontal pathway, driven means supporting said endless belt and for engagement by said drive means when said cartridge is received into said cavity, said drive means being for driving said driven means for transporting said endless belt in steps, said driven means being for indexing the slides one at a time to said viewing gate for illumination by said optical means, and an access port formed in said cartridge housing generally over said viewing gate to permit loading of a slide directly at said viewing gate;

said driven means comprising a take-up spindle and a drive spindle for supporting said endless belt within said cartridge housing and for guiding said belt through the horizontal pathway, said drive spindle being rotatably driven in steps by said driven means and including a toothed drive member in engagement with said belt for indexing said belt in steps for indexing the slides one at a time to said viewing gate;

said slide cartridge including a pair of drive spindles for indexing a respective pair of slides to a pair of viewing gates.

7. The slide projector assembly of claim 6 wherein said drive means includes means for independently rotating said pair of drive spindles.

8. The slide projector assembly of claim 6 wherein said pair of drive spindles and said take-up spindles cooperate to define a generally Y-shaped and generally horizontal slide pathway within said cartridge housing.

9. The slide proector assembly of claim 6 wherein said cartridge housing includes a pair of access ports respectively formed generally over said pair of viewing gates.

10. The slide projector assembly of claim 6 wherein said optical system includes a pair of light sources for respectively illuminating said pair of viewing gates, a single lens unit, and means for directing light from said light sources passing through said viewing gates generally along a common axis for passage through said lens unit.

11. The slide proejctor assembly of claim 2 wherein said toothed drive member indexes each slide individually to said viewing gate and supports leading and trailing slides at approximately 90 degrees relative to the slide at the viewing gate to avoid interferring with the projection of images therefrom.

12. A cartridge which cooperates with a slide projector to project images carried by slides when presented at a viewing gate, said cartridge comprising:

an endless belt for carrying the slides along a generally planar pathway;

a take-up spindle which supports said endless belt and guides it through a portion of said pathway;

a drive spindle for driving said endless belt and which also supports said endless belt and guides it through a portion of said pathway, one of said drive and take-up spindles being positioned generally adjacent the viewing gate and including means for indexing the slides one at a time to the gate for viewing; and a protective encasement which substantially encloses said endless belt and said spindles and having an access port formed therein generally over the gate to permit loading of a slide directly into the gate and to permit removal of a slide from within said encasement when said slide to be removed is at said gate.

13. The cartridge according to claim 12 wherein said endless belt comprises two parallel resilient bands joined to a plurality of slide holders, and further including a belt tension spring for maintaining a predetermined tension on said endless belt.

14. The cartridge according to claim 12 wherein said protective encasement includes projection ports situated generally adjacent the viewing gate to allow the images contained on the slides to be illuminated and projected by the slide projector as the slides are presented at the viewing gate.

15. The cartridge according to claim 12 wherein one of said drive and take-up spindles includes means for indexing each slide individually to the gate and for maintaining leading and trailing slides generally in about 90-degree spaced relation to the slide at the gate.

16. A cartridge for carrying slides along a generally planar pathway to a viewing gate whereat the images imprinted on the slides can be projected, said cartridge comprising:

a protective encasement defining the outer boundaries of said cartridge and having the viewing gate therein;

an endless belt within said encasement for carrying the slides along the pathway;

means for supporting said endless belt and for drivingly guiding it through the pathway to move the slides one at a time to the gate; and means for permitting the slides to be loaded into said belt directly at the viewing gate.

17. A slide projector assembly, comprising:

a projector housing having an open-sided, upwardly open cavity formed therein;

a drive motor within said projector housing;

a drive shoe wheel and a slide catcher wheel within said cavity generally on opposite sides of a viewing gate;

means coupled between said motor and said drive shoe and slide catcher wheels for simultaneous stepwise rotation of said drive shoe wheel through approximately 90 degrees and said slide catcher wheel through approximately 360 degrees, said slide catcher wheel having a slide-receiving recess formed therein and opening generally toward said gate between rotational steps;

a slide cartridge housing;

a drive spindle and a take-up spindle supported in spaced relation within said cartridge housing, said drive spindle including means for engaging said drive shoe wheel when said cartridge housing is received into said cavity in said projector housing;

an endless belt wrapped about said spindles within said cartridge housing;

a toothed indexing member on said drive spindle for indexing said slides one at a time to said gate and for maintaining a slide at said gate generally in 90-degree spaced relation with respect to leading and trailing slides; and optical means within said projector for illuminating said slide at said gate for projection of images thereon;

said cartridge housing having an access opening formed therein generally over said gate.

18. The slide projector assembly of claim 17 further including a closure cap for selectively closing said access opening.

19. The slide projector assembly of claim 17 wherein said endless belt is unitarily molded to include a plurality of slide holders.

20. The slide projector assembly of claim 17 including means for programming operation of said drive motor.

21. A slide projector assembly, comprising:

a projector housing having a cavity formed therein with a plurality of viewing gates disposed generally within said cavity;

drive means within said projector housing and extending into said cavity generally adjacent each of said viewing gates;

optical means within said projector housing for providing a source of light for illuminating each of said viewing gates; and a slide cartridge for reception into said cavity, said slide cartridge including an endless belt for carrying a plurality of slides, means for supporting said endless belt for indexing movement of said slides carried thereby to said plurality of viewing gates, and means for driven engagement by said drive means when said belt is received into said cavity for indexing said belt.

22. The slide projector assembly of claim 21 wherein said cartridge includes a cartridge housing encasing said endless belt, said belt support means including a pair of drive spindles and a take-up spindle within said cartridge housing for supporting said belt for movement generally along a generally Y-shaped pathway, each of said drive spindles being positioned generally adjacent a respective one of said gates.

23. The slide projector assembly of claim 22 wherein said drive means includes means for independently rotating said pair of drive spindles.

24. The slide projector assembly of claim 22 wherein said cartridge housing includes a plurality of access ports formed therein in positions respectively generally over said viewing gates.

25. The slide projector assembly of claim 21 wherein said optical means includes a plurality of light sources for respectively illuminating said gates, a single lens unit, and means for directing light from said light sources passing through said viewing gates for passage generally along a common axis through said lens unit.

26. The slide projector assembly of claim 22 wherein said cartridge housing defines tracks for guiding said endless belt along said pathway, said endless belt being expandable for movement along said pathway.

27. The slide projector assembly of claim 26 wherein said belt includes a plurality of slide holders each having one edge forming a belt link, and a plurality of foldable web bars forming additional belt links.

28. The slide projector assembly of claim 27 wherein said web bars are longer than said slide holders so that said tracks can receive the ends of said web bars without directly interacting with said slide holders.

29. The slide projector assembly of claim 28 wherein said tracks define said generally Y-shaped pathway for said belt, said pathway having first, second, and third ends, said plurality of gates including a first viewing gate situated at said first pathway end and a second viewing gate spaced from said first viewing gate and situated at said second pathway end, and further including access means situated generally above said first and second viewing gates to permit loading and removal of slides directly at said viewing gates.

30. The slide projector assembly of claim 29 wherein said belt supporting and indexing means comprises said pair of drive spindles including a first drive spindle for driving a portion of said belt through said cartridge and including a first toothed indexing member for engaging and rigidly controlling the position of three of said slide holders relative to said first viewing gate, and a second drive spindle for driving a portion of said belt through said cartridge and including a second toothed indexing member for engaging and rigidly controlling the position of three other of said slide holders at said second viewing gate, said take-up spindle being for driving a portion of said belt through said cartridge and being driven by said first driving spindle through an idler gear assembly.

31. A cartridge which cooperates with a slide projector to project images carried by slides, said cartridge comprising:

an expandable endless belt for carrying the slides along a generally Y-shaped planar pathway having at least two viewing gates situated along the length of the pathway whereat the images imprinted on the slides can be projected;

track means for defining said Y-shaped pathway and for guiding said expandable endless belt therealong; and means for stepwise driving of said expandable endless belt along said Y-shaped pathway and for positioning the slides at a respective one of said gates so their images can be projected by the slide projector.

32. The cartridge according to claim 31 wherein said belt includes a plurality of slide holders, one edge of each slide holder forming a link in said belt, and an expandable web forming at least one link between two adjacent slide holders.

33. The cartridge according to claim 32 wherein said expandable webs are longer than said slide holders for reception of said webs by said track means without direct interaction between said track means and said slide holders.

34. The cartridge according to claim 31 including a cartridge housing encasing said endless belt, and at least two ports formed in said cartridge housing, respectively, generally above said viewing gates to permit direct loading and removal of the slides at the adjacent viewing gate.

35. A cartridge for carrying slides along a generally planar pathway for projection of images imprinted on the slides, said cartridge comprising:

a protective encasement defining the outer boundaries of said cartridge;

an expandable endless belt for carrying the slides along the pathway which is substantially enclosed by said protective encasement;

a first viewing gate situated along the pathway whereat the images imprinted on a first slide can be projected;

a second viewing gate spaced from said first viewing gate and also situated along the pathway whereat the images imprinted on a second slide can be projected; and means for driving said belt and for simultaneously positioning two different slides respectively at said first and second viewing gates;

said protective encasement including a first access port situated generally above said first viewing gate and a second access port situated generally above said second viewing gate, each of said access ports permitting the loading and removal of the slides directly at the adjacent viewing gate.

36. A cartridge for carrying slides along a generally planar pathway, said cartridge comprising:

a protective encasement defining first and second viewing gates whereat images imprinted on the slides can be projected;

an expandable endless belt for carrying the slides along the pathway which is enclosed by said protective encasement;

a track within said encasement and defining the shape of the pathway for receiving portions of said belt for guiding said belt therealong; and means for driving said expandable endless belt in steps, said driving means including means for positioning two of the slides at the first and second viewing gates in generally 90-degree spaced relation with respect to leading and trailing slides.

37. The cartridge according to claim 36 wherein said protective encasement includes a first access port situated generally above the first viewing gate and a second access port situated generally above the second viewing gate, each of said access ports permitting the loading and removal of the slides directly at the adjacent viewing gate.

38. An expandable slide-carrying endless belt, comprising:

a plurality of slide holders, one edge of each slide holder forming a link in said expandable belt; and an expandable web defined by at least two foldable web bars forming at least one link between each adjacent pair of said slide holders, said foldable web bars being movable between folded and extended positions.

39. A slide projector assembly, comprising:

a projector housing having an open-sided, upwardly open cavity formed therein;

a pair of drive motors within said projector housing;

first and second drive shoe wheels respectively carried by said drive motors within said cavity at positions generally respectively adjacent first and second viewing gates;

a third drive shoe wheel within said cavity in spaced relation with said first and second drive shoe wheels;

idler drive means coupled between said third drive shoe wheel and one of said first and second drive shoe wheels;

a slide cartridge including a cartridge housing for reception into said cavity;

first and second drive spindles within said cartridge housing for driving engagement with said first and second shoe wheels, respectively;

a take-up spindle within said cartridge housing for driving engagement with said third shoe wheel;

track means within said cartridge housing defining a generally Y-shaped planar pathway extending about said first and second drive spindles and said take-up spindle;

an endless belt wrapped about said first and second drive spindles and said take-up spindles, said endless belt including means for guidable engagement with said track means and a plurality of slide holders, said belt being expandable along the length of said track means;

first and second indexing means respectively on said first and second drive spindles for driving said belt along said pathway and for moving a pair of slides supported by said slide holders to said first and second viewing gates, said pair of drive motors being independently operable for independently rotating said first and second drive spindles; and optical means within said projector housing including first and second light sources for respectively illuminating slides at said first and second viewing gates, a lens unit, and means for directing light passing through said first and second gates for passage through said lens unit.

40. The slide projector assembly of claim 39 wherein each of said first and second indexing means includes means for spacing a slide at the associated one of said viewing gates generally in 90-degree relation with leading and trailing slides and further for indexing every other slide along said belt to the associated one of said gates, said pair of drive motors being operable for indexing a first set of the slides to said first viewing gate and a second set of the slides to said second viewing gate.

41. The slide projector assembly of claim 39 wherein said track means has a collection portion along its length between said first and second viewing gates for receiving a varible length of said endless belt.

42. A slide projector assembly, comprising:

a projector housing having an open-sided and upwardly open cavity formed therein;

drive means within said projector housing and extending into said cavity at a position generally opposite the open side of said cavity and generally adjacent a projector viewing gate;

optical means within said projector housing for providing a source of light illuminating said viewing gate; and a slide cartridge for reception into said cavity, said slide cartridge including a cartridge housing enclosing an endless belt including means for carrying a plurality of slides along a generally horizontal pathway, driven means supporting said endless belt and for engagement by said drive means when said cartridge is received into said cavity, said drive means being for driving said driven means for transporting said endless belt in steps, said driven means being for indexing the slides one at a time to said viewing gate for illumination by said optical means.

43. The slide projector assembly of claim 42 wherein said cartridge has a size and shape to fit within said cavity generally within the profile of said projector housing.

* * * * *